United States Patent Office 3,719,776
Patented Mar. 6, 1973

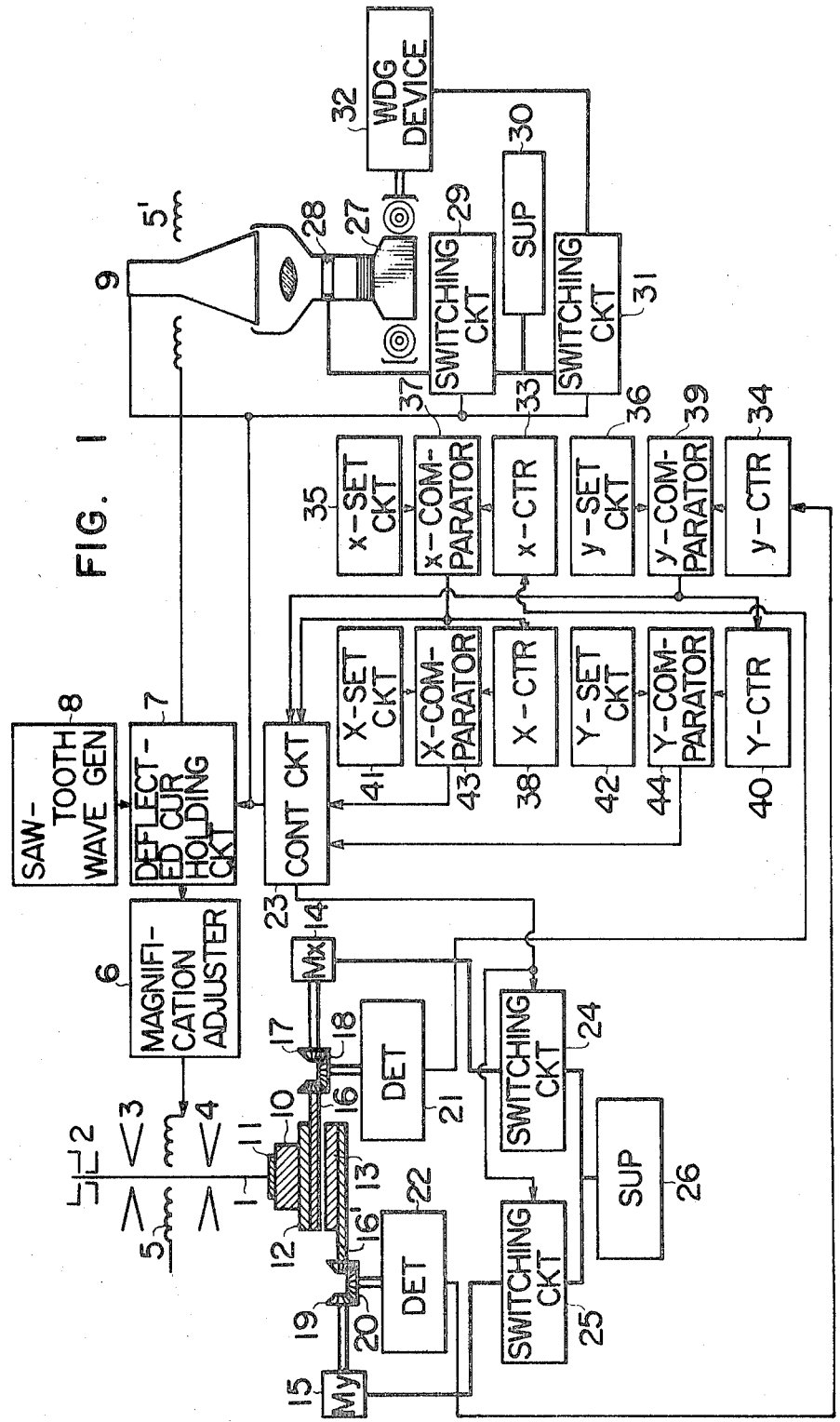

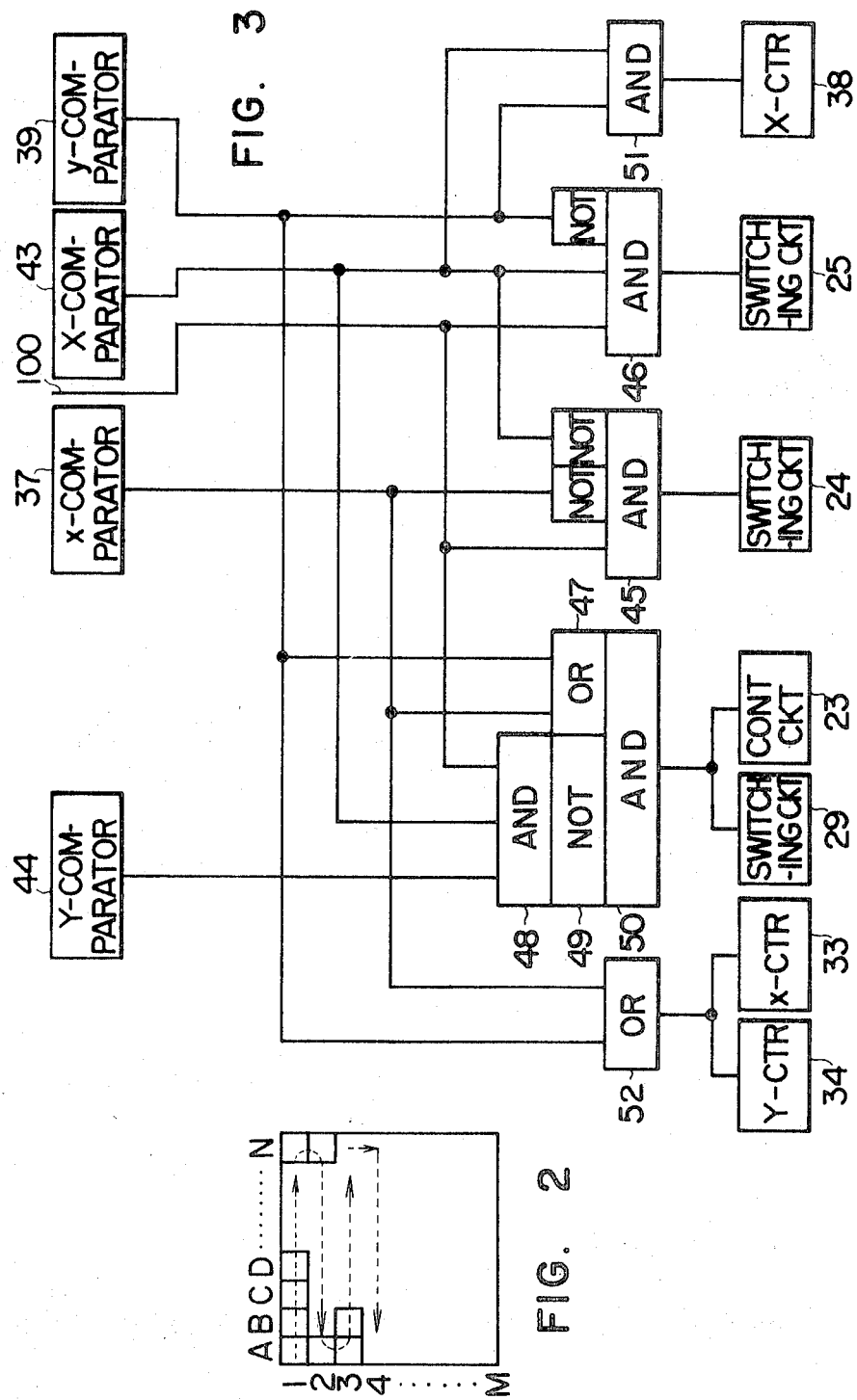

3,719,776
APPARATUS FOR PHOTOGRAPHING AN IMAGE OF A SPECIMEN
Tatsuo Fujiyasu, Katuta, and Yoshio Ohnuma, Hitachi, Japan, assignors to Hitachi, Ltd., Tokyo, Japan
Filed Aug. 11, 1970, Ser. No. 62,863
Claims priority, application Japan, Aug. 11, 1969, 44/62,876
Int. Cl. H04n 5/84; H01j 37/26
U.S. Cl. 178—6.7 R           12 Claims

ABSTRACT OF THE DISCLOSURE

An apparatus for automatically and continuously photographing an image of a specimen having a control arrangement for scanning a predetermined region of the specimen by means of an electron beam; means for displaying the image of said region of the specimen on a screen of a cathode ray tube synchronized with said scanning; a camera for photographing the image displayed on the screen; and means for shifting the specimen along X and Y axes in accordance with a predetermined sequence.

BACKGROUND OF THE INVENTION

This invention relates to an apparatus for automatically and continuously photographing an image of a specimen displayed on a screen of a cathode ray tube synchronized to the scanning of the specimen by means of an electron beam.

In the fields of scanning type electron microscopes, X-ray microanalyzers and other similar electronic display devices, it is sometimes required to observe or investigate a sample which is in the range of 15–50 mm. in diameter. In this case, in order to minutely observe the whole surface of the specimen, images of respective observation fields which are determined by subdividing the whole observation field into a predetermined number of portions are displayed on a screen of a cathode ray tube, and a respective image thus displayed is photographed with a relatively low magnification, such as, for example, 500 times. By determining a region or regions to be minutely investigated through selection of the region from all the photographs thus obtained, the region is photographed by an enlarged magnification.

Even when a specimen of 15 mm. in diameter is photographed with a magnification of 500 times over the whole surface of the specimen, about 60 to 80 photographs should be taken altogether. Furthermore, in the case where a magnification of 1000 is utilized, about 120 to 160 photographs should be taken altogether. Therefore, it takes a very long time to carry out the photograph operation by hand. In addition, the above-mentioned operation has such disadvantages that an operator must precisely shift the specimen to be exposed to the scanning of the electron beam, and record the shifting order of the specimen in the data card at every step of the photographing operation.

It is an object of the present invention to provide an apparatus capable of automatically and continuously photographing an image of a specified region of the sample surface, displayed on a screen of a cathode ray tube.

It is another object to provide an apparatus capable of carrying out the photography at a desired magnification without resorting to troublesome manual operations.

These and other objects and features of the present invention will be apparent from the following description, taken in conjunction with the accompanying drawing, in which FIG. 1 is a block diagram of the photograph apparatus according to the present invention;

FIG. 2 shows a shifting sequence of the specimen; and

FIG. 3 is a schematic diagram of a control circuit used in the apparatus shown in FIG. 1.

According to the present invention, there is provided an apparatus for photographing an image of a specified region of a specimen to be investigated, which is able to automatically and continuously photograph the specimen in synchronization with scanning of an electron beam.

FIG. 1 shows a block diagram of an embodiment of an apparatus for photographing the image of the specimen, according to the present invention, for use with an electron microscope. An electron beam 1 produced by an electron beam generator 2 is focused by lenses 3 and 4 in the conventional manner, and the focused electron beam 1 is deflected by deflection coils 5 provided with a saw-tooth wave current from a saw-tooth wave generator 8 applied through a magnification adjuster 6. The saw-tooth wave current is also provided to a deflection coil 5' of a cathode ray tube 9, whereby an electron beam in the cathode ray tube 9 is deflected in synchronization with scanning of a specimen 11 fixed on a holder 10, by means of the deflected electron beam 1 in the microscope.

The holder 10 for fixing the specimen 11 is supported on fine adjusting bases 12 and 13 which are mounted so as to be capable of slight movement respectively, along X and Y axes by means of motors 14 and 15. Respective orthogonal movement of the bases 12 and 13 along the X or Y axis is effected, for example, by rotating the two threaded shafts 16 and 16' which are operated by the motors 14 and 15 through gears 17, 18 and 19, 20. Since the orthogonal positioning arrangement provided by these elements is well known, per se, the details of the arrangement have not been specifically illustrated.

Detectors 21 and 22 give information based on the rotation of the gears 18 and 20, for example in the form of a digiltad signal, to thereby detect the shifting distances of the specimen 11 on the fine adjusting bases 12 and 13. The output from the saw-tooth wave generator 8 is transmitted through a deflected current holding circuit 7 to the magnification adjuster 6 for controlling the peak value of the saw-tooth wave current and for providing the thus controlled signal to the deflection coils 5. The deflected current holding circuit 7 also delivers the saw-tooth wave current to the deflection coil 5' of the cathode ray tube 9.

The deflected current holding circuit 7 is switched on in response to a signal from a control circuit 23 to thereby deliver the pulses for deflecting the electron beam 1 through the magnification adjuster 6.

After fixing the specimen 11 on the holder 10, the sawtooth wave current is delivered by the deflected current holding circuit 7 to the deflection coil 5 of the microscope through the magnification adjuster 6 and to the deflection coil 5' of the cathode ray tube 9.

The scanning region to be photographed is displayed on the screen of the cathode ray tube 9 and the image displayed on the screen is photographed by a camera 27 disposed in front of the screen of the cathode ray tube 9. After photographing the image of the scanning region, the deflected current holding circuit 7 is switched off in response to information provided by the control circuit 23 when the holding circuit 7 receives the next signal from the control circuit 23.

The signals from the control circuit 23 cause the switching circuits 24 and 25 to operate the motors 14 and 15, respectively, so that the scanning area of the specimen 11 is shifted to the next region to be photographed.

The camera 27 is disposed in front of the cathode ray tube 9 so as to photograph the image displayed on the cathode ray tube 9. The control circuit 23 provides an information signal to a switching circuit 29, which is connected to a supply 30, to operate the shutter 28 provided between the screen and the camera 27 and also provides the information signal to a switching circuit 31, which selectively connects the supply 30 to a winding device 32 for winding the film in the camera 27. In this system, during the scanning of a specified region of the specimen 11 by means of the electron beam 1, the switching circuit 29 keeps the shutter open. After the completion of the scanning within the specified region, the shutter 28 is closed and at the same time the winding device 32 begins to wind to film in accordance with the information signal provided from control circuit 23 to the switching circuits 29 and 31. According to information indicating close of the shutter 28 and completion of winding of the film, the cathode ray tube 9 is provided with a blocking signal from control circuit 23 to eliminate the image on the screen.

In the positioning system, when the gears 18 and 20 individually turn once, the fine adjusting bases 12 and 13 are respectively moved by a predetermined distance, such as, for example 50 or 100 microns along the X and Y axes. As described above, the distances of the fine adjusting bases along the X and Y axes can be minutely determined.

The detectors 21 and 22, which include proper detecting means, such as, for example, microswitches (not shown), detect the number of rotations of the shafts driven by the motors 14 and 15, thereby to produce pulses corresponding to the number of rotations of shafts, i.e., the moving distances of the fine adjusting bases along the X or Y axis.

An X-counter 33 and a Y-counter 34 count the number of pulses provided by the detectors 21 and 22, respectively, thereby to determine the moving distances along the X and Y axes of the fine adjusting bases 12 and 13. The distances along the X and Y axes to be moved at every photograph step are previously set in an $x$-set circuit 35 and a $y$-set circuit 36 in a suitable manner, such as, a method of providing information from the magnification adjuster 6 with the above set circuits 35 and 36 through an A-D converter (not shown). When the number of pulses counted by the $x$-counter 33 becomes equal to the predetermined number stored in the $x$-set circuit 35, an $x$-comparator 37 transmits a pulse to the control circuit 23 and an X-counter 38. On the other hand, when a value counted by the $y$-counter 34 becomes equal to that set in the $y$-set circuit 36, a $y$-comparator 39 transmits a pulse to the control circuit 23 and a $y$-counter 40. The $x$-counter 33 and $y$-counter 34 are reset at every step of photograph in accordance with information from the control circuit 23.

The number of photographs is equal to the product of the dividing numbers along the X and Y axes, and so the number of photographs occuping a line along the Y axis is registered in a Y-set circuit 42. On the other hand, the X-set circuit 41 stores the number of photographs on each line along the X axis. When a value counted by the X-counter 38 becomes equal to that of the X-set circuit 41, an X-comparator 43 delivers a signal to the control circuit 23. Thereafter, the X-counter 38 is reset by the signal of the X-comparator 43 and the switching circuit 25 is operated to move the fine adjusting base 13 along the X axis. On the other hand, when a value counted by the Y-counter 40 becomes equal to that stored in the Y-set circuit 42, a Y-comparator 44 delivers a signal to the control circuit 23. When signals are received from both the comparator 43 and the comparator 44, it is determined that the entire specimen has been scanned.

The saw-tooth wave generator 8 produces saw-tooth waves having a predetermined wave form thereby to determine the width and length of scanning in accordance with an electron beam along the X and Y axes. Accordingly, the scanning region is determined by the form of the saw-tooth wave. Information indicating that the scanning has been completed is provided by the signal from the saw-tooth wave generator 8.

FIG. 2 is a diagram for explaining the shifting sequence of the specimen. After photographing the image of the region A of the specimen, the specimen is moved by the shifting system mentioned above so as to shift toward the region B next to the region A until the X-comparator 37 transmits the signal to the control circuit 23 and the X-counter 38 indicating that the region B of the speciment is properly positioned. This information is stored in the X-counter 38. As mentioned above, the scanning region of the specimen is shifted one after another along the X axis until the scanning region reaches the region N at the end of the first line of FIG. 2.

After the scanning of the region N on line 1 is finished, the specimen is shifted to the region N on line 2 and at the same time the X-counter 38 is automatically reset. Namely, the control circuit 23 turns the switching circuit 25 on in accordance with the signal provided by the X-comparator 43 indicating that one line is completed. When the scanning region reaches the region N on line M, the $x$-comparator 37 and Y-comparator 44 both transmit a signal indicating that the last scanning region of the specimen has been exposed to the electron beam, thereby to control circuit 23. According to this information, the last scanning is started.

FIG. 3 shows a schematic diagram of the control circuit 23 employed in the apparatus shown in FIG. 1. A signal produced by the saw-tooth wave generator 8, which indicates completion of a photograph, is applied on line 100 to AND circuits 45, 46 and 48.

The AND circuit 45 receives a NOT signal from the X-comparator 43 which indicates that the scanning region has not been located in the region N on every line, a NOT signal from the X-comparator 43 which indicates that the region to be scanned has not reached the next region, and a signal from the line 100. In accordance with this information, the AND circuit 45 delivers a control signal to the switching circuit 24 to operate motor 14.

The AND circuit 46 receives a signal from the X-comparator 43 which indicates that the scanning region has been located in the region N on every line, a NOT signal from the y-comparator 39 which indicates that the scanning region has not reached the next line of column N, and a signal from the line 100. In accordance with these signals, the AND circuit 45 delivers a signal to the switching circuit 25 to operate motor 15.

An OR circuit 47 receives signals produced by the $y$-comparator 39 and $x$-comparator 37 which indicate that the scanning region fully reaches the next region, and in accordance with this signal, the OR circuit 47 delivers a signal to an AND circuit 50 which applies a signal to the control circuit 23 and the switching circuit 29 to close the shutter 28.

An AND circuit 48 receives signals from the line 100 and the X-comparator 43 and the Y-comparator 44 which indicate that the scanning region reaches the area N on line M, and in accordance with these signals, the AND circuit 48 delivers a signal to the AND circuit 50 through a NOT circuit 49. In accordance with information including signals given by the X-comparator 43 and the $y$-comparator 39 through an AND circuit 51, the X-counter 38 is reset. According to an OR circuit 52 which receives a signal given by the $x$-comparator 37 and the $y$-comparator 39, the $x$-counter 33 and the $y$-counter 34 are reset.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What we claim is:

1. An apparatus for photographing an image of a specimen comprising:
   scanning means for sequentially scanning specified regions of a specimen with a deflected electron beam in accordance with a predetermined sequence of scanning;
   display means for displaying an image of each of said specified regions on a screen of a cathode ray tube in synchronization with scanning of said regions by said deflected electron beam;
   positioning means for shifting the specimen in order to expose to said deflected electron beam a specified region following the region previously scanned in said predetermined sequence of scanning;
   means for photographing the image displayed on said screen; and
   means for advancing a film in response to information indicating that a photograph has been completed, said positioning means automatically shifting the specimen the distance of the scanned region in response to information indicating that a photograph has been completed.

2. An apparatus for photographing the image of a specimen as defined in claim 1, wherein said positioning means includes adjusting means for selectively moving said specimen in respective first and second orthogonal directions, detecting means for detecting the extent of each movement of the specimen in said respective first and second orthogonal directions, and control means for controlling said adjusting means to effect a sequential positioning of said specimen in accordance with the predetermined scanning sequence of said scanning means.

3. An apparatus for photographing the image of a specimen as defined in claim 2, wherein said adjusting means includes first and second drive means for driving said specimen in said first and second directions, respectively.

4. An apparatus for photographing the image of a specimen as defined in claim 3, wherein said detecting means include first and second detectors responsive to said first and second drive means, respectively, and each providing successive output signals indicating by their number the extent of movement of said specimen.

5. An apparatus for photographing the image of a specimen as defined in claim 4, wherein said scanning means includes means generating a deflection signal and a holding circuit connected to said generating means for providing a first control signal indication completion of one scanning frame.

6. An apparatus for photographing the image of a specimen as defined in claim 5, wherein said control means includes first storage means for storing first and second values representing the extent of movement of said specimen in said first and second directions necessary to shift said scanning from one specified region to the next in accordance with said predetermined sequence, second storage means for storing the respective outputs of said first and second detectors, and first comparison means for comparing the values stored in said first storage means with the values stored in said second storage means, respectively, and providing first and second control outputs when comparison is detected.

7. An apparatus for photographing the image of a specimen as defined in claim 6, wherein said control means further includes third storage means for storing a value equal to the number of successive regions making up one dimension of said specimen, fourth storage means connected to said first comparison means for counting said first control outputs, and second comparison means for comparing the values stored in said third and fourth storage means and providing a third control output when comparison is detected.

8. An apparatus for photographing the image of a specimen as defined in claim 7, wherein said control means further includes fifth storage means for storing a value equal to the number of regions making up a second transverse dimension of said specimen, sixth storage means connected to said first comparison means for counting said second control outputs, and third comparison means for comparing the values stored in said fifth and sixth storage means and providing a fourth control output when comparison is detected.

9. An apparatus for photographing the image of a specimen as defined in claim 8, wherein said control means further includes logic circuit means for controlling said first and second drive means in response to receipt of said first, second, third, and fourth outputs.

10. An apparatus for photographing the image of a specimen as defined in claim 9, further including magnification adjusting means connected between said holding circuit and a deflection coil means for deflecting said electron beam for varying the deflection of said electron beam by a selectively variable amount so as to render the size of a scanned region adjustable.

11. An apparatus for photographing an image of a specimen comprising:
    scanning means for sequentially scanning a predetermined region of the specimen with a deflected electron beam in a predetermined sequence;
    display means for displaying an image of said predetermined region of the specimen on a screen of a cathode ray tube in synchronization with deflection of said electron beam;
    means for photographing said image displayed on the screen;
    a circuit for holding a deflection signal which provides a first control signal representing completion of scanning of one frame;
    positioning means for shifting said specimen to transfer said scanning region to the next region in said predetermined sequence in response to said first control signal provided by said holding circuit;
    winding means for automatically advancing said film in accordance with said first control signal provided by said holding circuit;
    detecting means for detecting the shifting distances along X and Y axes of said specimen in accordance with operation of said positioning means and for delivering a second control signal to said scanning means for starting the deflection scanning of said electron beam in a predetermined sequence; and
    means for automatically controlling a shutter of said photographing means in accordance with a third control signal given by said detecting means to said holding means.

12. An apparatus for photographing an image of a specimen according to claim 11, characterized in that said apparatus further includes magnification adjusting means provided between said holding means and a deflection coil for deflecting said electron beam by a selectively variable amount so as to render the size of a scanned region adjustable;
    means for registering predetermined distances to be scanned along X and Y axes by said electron beam; and
    means for comparing shifting distances with said predetermined distances in accordance with information provided by said detecting means.

References Cited

UNITED STATES PATENTS

| | | | |
|---|---|---|---|
| 3,229,087 | 1/1966 | Shapiro | 250—49.5 |
| 3,098,187 | 7/1963 | Sciaky | 318—640 |
| 3,457,422 | 7/1969 | Rottmann | 318—640 |

J. RUSSELL GOUDEAU, Primary Examiner

U.S. Cl. X.R.

250—49.5 PE; 318—640